Oct. 23, 1928.
O. J. HAUGEN
BROODER
Filed April 24, 1926 2 Sheets-Sheet 1
1,688,925
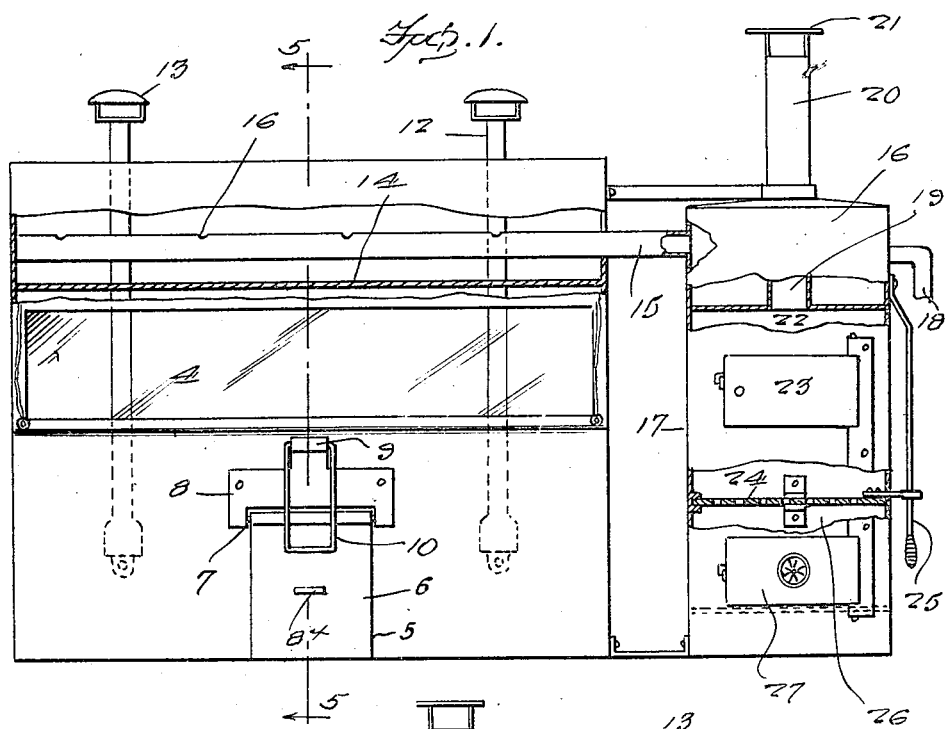
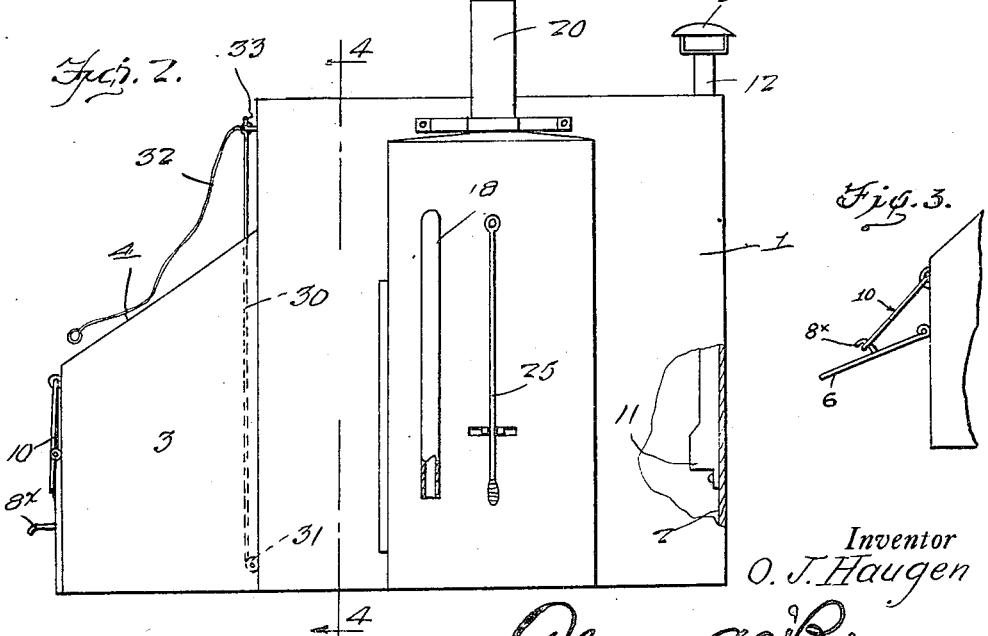
Inventor
O. J. Haugen
By Clarence A O'Brien
Attorney

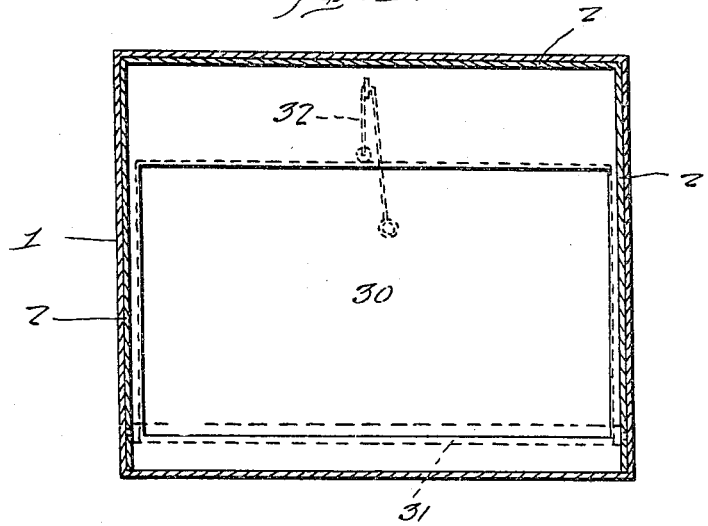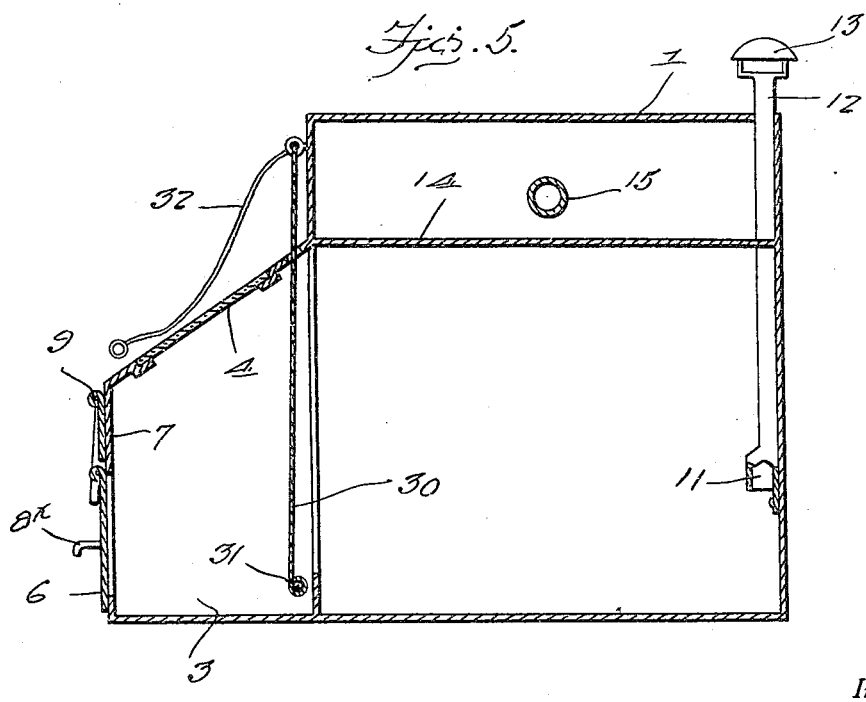

Patented Oct. 23, 1928.

1,688,925

UNITED STATES PATENT OFFICE.

OLE J. HAUGEN, OF MAPES, NORTH DAKOTA.

BROODER.

Application filed April 24, 1926. Serial No. 104,422.

My present invention has to do with the care and raising of young chicks; and it has for its general object the provision of a brooder which while simple and inexpensive in construction is adapted to adequately protect chicks against cold, wind, and dampness, and is also adapted to confine the chicks in an atmosphere that is maintained at a desirable temperature and yet is prevented from becoming foul.

The invention also contemplates the provision of a brooder of such type that when deemed expedient, the chicks may be supplied with daylight and may be subjected to the beneficial action of the sun.

Other objects and advantages of the invention will be fully understood from the following description and claim when the same are read in connection with the drawings, forming a part of this specification, in which:

Figure 1 is a view, partly in elevation, and partly in section of the brooder constituting the best practical embodiment of my invention that I have as yet devised.

Figure 2 is a view taken at right angles to Figure 1, and with parts in elevation and other parts in vertical section.

Figure 3 is a detail view showing the door secured in open position.

Figures 4 and 5 are sections taken on the lines 4—4 and 5—5, respectively, of Figures 2 and 1.

Similar numerals of reference designate corresponding parts in all views of the drawings.

The casing body 1 of my novel brooder is preferably, though not necessarily, formed of appropriate sheet metal, lined with soft material 2, Figure 2, which soft material is preferably asbestos.

Fixed with respect to the casing body 1, and in communication with the interior thereof is a sub-casing 3, the top of which is preferably inclined as shown in Figures 1 and 2, and designated by 4, and is formed in whole or part of glass, in order that day light may be supplied to the interior of the casing body 1, and when desired, the chicks may bask in the sunlight.

An opening 5 is provided in the front wall of the sub-casing 3 through which the chicks may pass to and from the yard (not shown), the said opening 5 being normally closed by a door 6 hinged at 7 in a fixed bracket 8, and provided with a hooked projection $8^x$ as shown. Also hinged at 9 to the bracket 8 is a swingable retainer 10 of open form, the said retainer 10 being designed when the door is closed to hang in idle position as illustrated, and being also designed when the door 6 is swung to open position to be engaged with the projection $8^x$ so as to detachably maintain the door in raised and open position as shown in Fig. 3.

Connected with the interior of the casing body 1 as shown at 11 in Figure 2 are vent pipes 12, capped as indicated by 13. Manifestly by connecting the interior of the body 1 with the atmosphere, the vent pipes 12 will effectively prevent the air within the casing body 1 from becoming foul, and by virtue of the caps 13 rain is precluded from gaining access to the interior of the casing body 1.

The casing body 1 is divided by a partition 14 into lower and upper compartments, the lower compartment being designed for the reception of chicks and the upper compartment being designed for the confinement of heated air supplied to the upper compartment through a conduit 15 having apertures 16 in communication with the said upper compartment.

It is within the purview of my invention to supply heated air to the upper compartment of the casing body 1 by any suitable means, or from any appropriate or desirable source of supply. I prefer, however, for reasons of economy, to supply the said heated air to the conduit 15 by a drum 16 comprised in a furnace 17, the said drum 16 having an inlet pipe 18 which is in communication with the atmosphere at a point preferably adjacent to the ground, Figure 2, and has the pendent portion shown in Figures 1 and 2 with a view to lessening the liability of undue moisture entering the upper compartment of the casing body 1. At this point, I would have it understood that the heating of the lower compartment in the casing 1 is effected by radiation from the partition wall 14, and while the temperature in the said lower compartment of the casing body 1 will be kept sufficiently high for the maintenance of the health of the chicks, there is no liability of the said lower compartment being unduly heated at any time.

The furnace 17 has the usual casing in and on which the drum 16 is supported, and it will also be noted that the furnace has a vertical central conduit 19 which is in communication with an uptake 20, having at its upper end a cap 21. The drum 16 is arranged immediately above the combustion chamber 22 of the furnace, and it will be noted that the said combustion chamber 22 is equipped with a conventional door 23, and a conventional or other appropriate movable grate 24, the latter in connection with a handle 25 through the medium of which the grate may be moved to and fro in a horizontal plane as when it is desired to precipitate ashes or other products of combustion from the combustion chamber 22 to the ash pit 26, associated with which is a door 27. At this point I desire it understood that I prefer to have the grate 24 of foraminous plate form as illustrated in Figure 1, so that, for reasons of economy, barn yard manure may be used as fuel in the furnace. It is to be understood, however, that an appropriate fuel may be used in the furnace, and that, therefore, the grate 24 may be of any suitable type.

It will be apparent from the foregoing that while in use, my novel brooder will require little or no attention and it will also be apparent that when chicks have attained suitable age, the door 6 may be opened so as to permit the chicks to range from the lower compartment in the casing body 1 to a yard and vice versa; and that when the door 6 is closed, there is no liability of the chicks being injured.

When it is desired to prevent the chicks from passing from the lower compartment of the casing body 1 into the subcasing 3, the curtain 30 shown in Figures 2, and which controls communication between the compartment of the casing body 1, and the sub-casing 3 is raised, the said curtain 30 being connected with a conventional spring roller 31, and being equipped with one or more strings 32, preferably two strings, which extend through guides 33 and are provided in order to enable an attendant to conveniently raise the curtain 30 and as readily lower the said curtain when it is desired to establish communication between the lower compartment of the casing body 1 and the interior of the subcasing 3.

Manifestly, through the medium of the strings 32 in conjunction with the guides 33, the curtain 30 may when desired be detachably secured in raised position, as illustrated in Figure 2.

Fresh air may enter the lower compartment of the casing body 1 to ventilate the same through the opening which receives the curtain 30 and also through the opening 5, the latter when the door 6 is slightly opened and is maintained in such state. When deemed expedient, the upper compartment of the casing body may be provided with one or more appropriate vents, not illustrated.

I have entered into a detailed description of the construction and relative arrangement of the parts embraced in the present and preferred embodiment of my invention in order to impart a full, clear, and exact understanding of the said embodiment. I do not desire, however, to be understood as limiting myself to the precise structure illustrated and described, my invention being defined by my appended claim within the scope of which structural changes and changes in arrangement may be made without departure from my invention.

Having thus described the invention, what I claim as new and desire to secure by Letters Patent is:—

A brooder comprising a casing body having a compartment to receive chicks, means for heating said compartment, a sub-casing in communication with the interior of said compartment at one end thereof and having an inclined transparent top and also having a vertically disposed opening in said top at a point adjacent to the compartment and further having an opening in its wall remote from the compartment, a door for the latter opening, means for detachably securing said door in open position, a vertically movable curtain between the interior of the said compartment and the interior of the sub-casing, spring actuated means in the lower part of the casing body for taking up or lowering said curtain, and means movable through the said opening in the top of the sub-casing through the medium of which the curtain may be raised and the lowering of the curtain may be controlled.

In testimony whereof I affix my signature.

OLE J. HAUGEN.